Aug. 12, 1924.
J. G. HEARD
1,504,343
DENTAL MIRROR
Filed March 1, 1923
Fig. 1.
Fig. 2.
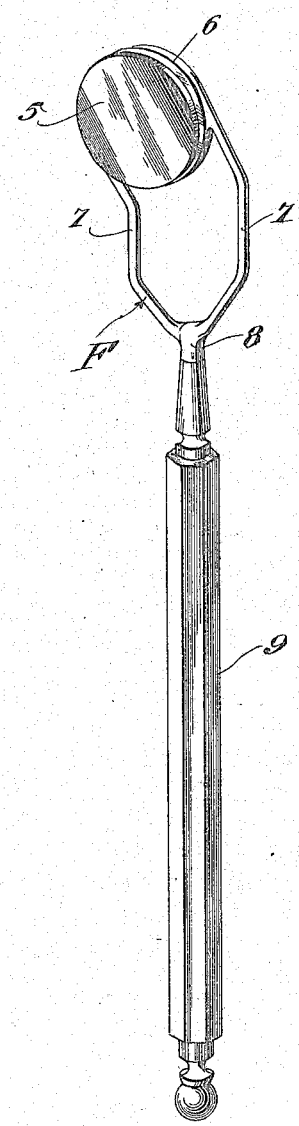
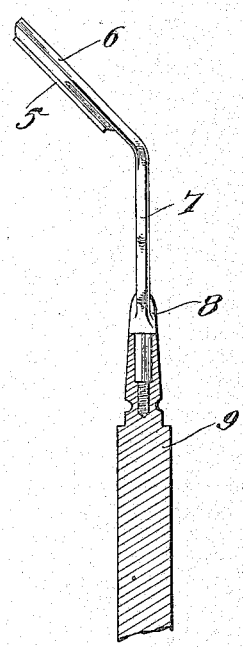
Inventor
Joseph G. Heard,
By Mason, Fenwick & Lawrence.
Attorneys Patented Aug. 12, 1924.

1,504,343

UNITED STATES PATENT OFFICE.

JOSEPH G. HEARD, OF ATLANTA, GEORGIA.

DENTAL MIRROR.

Application filed March 1, 1923. Serial No. 622,088.

*To all whom it may concern:*

Be it known that JOSEPH G. HEARD, citizen of the United States, residing at Atlanta, in the county of Fulton and State of Georgia, has invented certain new and useful Improvements in Dental Mirrors; and he does hereby declare the following to be a full, clear, and exact description of the invention, such as will enable others skilled in the art to which it appertains to make and use the same.

This invention relates to a dental instrument which includes a mouth mirror. It is an object of the invention to provide an instrument wherein the mirror supporting means shall be so constructed as to leave a clear working space between the mirror and handle of the instrument. The improved instrument embodies a forked member of two stems or tines at the free end of which the mirror is supported, the stems being of sufficient length to position the mirror a considerable distance from the head or root of the fork, and the said head being adapted for connection to a suitable handle.

The novel features of the invention will appear in the detailed description taken in connection with the accompanying drawings forming a part of this specification.

Referring to the drawings:

Figure 1 is a perspective view of the invention; and

Fig. 2 is a side view in the plane of the mirror, and a part of the handle being shown in section.

In the drawings, 5 indicates a mirror suitably mounted in a support 6. The mirror support is secured between tines 7 of a fork F; the latter having a suitable head 8 on to which a handle 9 may be screwed. The tines of the fork are bent at a point intermediate the support 6 and the head 8. In other words, the support is arranged at an angle with respect to the handle.

The improved instrument has many points of superiority over the common dental mirror. The mirror supporting stems when held against the cheek muscles, not only provide more operating room, but also allow more light to reach the mirror. The space between the head of the stems and the mirror allows various instruments to be inserted between the stems without in any manner interfering with the reflecting properties of the mirror. The instrument also has utility aside from its use as a mirror, for example, as a mouth prop to prevent the patient from biting down when using delicate instruments. Other uses and advantages of the improved mirror will readily occur to those skilled in the art.

What I claim is:

1. A dental instrument comprising a handle having a head from which extends two spaced stems, and a mirror supported in the free ends of said stems, said head being distant from the mirror, whereby a clear space is provided between the mirror and head for the reception of dental tools.

2. A dental instrument comprising a handle having a head from which extends in a common direction a pair of stems, a mirror supported in the free ends of said stems, the stems being of a length to position the said head a distance from the mirror to provide a clear working space for dental tools between the head and mirror inside the boundary of said stems.

3. A dental instrument comprising a handle having a head from which extends a pair of spaced stems bent intermediate their ends, a mirror supported in said bent portion of said stems, the said head being distant from the mirror to provide a clear space between the mirror and head for the reception of dental tools.

In testimony whereof I affix my signature.

JOSEPH G. HEARD.